(12) United States Patent
Heide et al.

(10) Patent No.: US 6,946,949 B2
(45) Date of Patent: *Sep. 20, 2005

(54) ANTI-THEFT PROTECTION SYSTEM FOR A MOTOR VEHICLE, AND A METHOD FOR OPERATING AN ANTI-THEFT PROTECTION SYSTEM

(75) Inventors: Patric Heide, Neubiberg (DE); Johannes Ilg, Regensburg (DE); Richard Roskosch, Ottobrun (DE); Klause Hofbeck, Neumarkt (DE); Wolfgang Piesch, Regenstauf (DE); Martin Vossiek, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 254 days.

This patent is subject to a terminal disclaimer.

(21) Appl. No.: 09/725,500

(22) Filed: Nov. 30, 2000

(65) Prior Publication Data

US 2002/0008615 A1 Jan. 24, 2002

(30) Foreign Application Priority Data

Nov. 30, 1999 (DE) .......................................... 199 57 536

(51) Int. Cl.[7] .............................................. G05B 19/00
(52) U.S. Cl. ..................................... 340/5.61; 340/5.72
(58) Field of Search ........................... 342/70, 127, 42, 342/457; 701/1; 340/5.61, 5.31, 5.42, 5.72, 146.2, 10.1, 10.3, 5.26, 5.52, 5.62, 5.2, 5.86, 5.64, 5.28, 426.1, 426, 543, 7.2, 825.69, 825.72; 700/302, 282, 150; 235/380, 384

(56) References Cited

U.S. PATENT DOCUMENTS

| 4,054,837 | A | | 10/1977 | Hibbs, Jr. et al. ............. 325/21 |
|---|---|---|---|---|
| 4,723,121 | A | * | 2/1988 | van den Boom et al. .. 340/5.26 |
| 5,001,486 | A | | 3/1991 | Bächtiger ..................... 342/42 |
| 5,051,741 | A | | 9/1991 | Wesby ................... 340/825.49 |
| 5,307,193 | A | | 4/1994 | VanZeeland et al. ........ 359/145 |

(Continued)

FOREIGN PATENT DOCUMENTS

| DE | 25 37 421 A1 | 7/1976 | ............ H01R/7/04 |
|---|---|---|---|
| DE | 38 38 657 A1 | 5/1990 | ............ G01R/31/04 |
| DE | 9410369 | 11/1994 | ............ B60R/25/10 |
| DE | 4329697 | 3/1995 | ............ E05B/49/00 |
| DE | 29607877 | 9/1996 | ............ B60R/25/10 |
| DE | 4409167 | 3/1998 | |
| DE | 19752029 | 6/1999 | ............ B60R/25/00 |
| DE | 19825702 | 12/1999 | |
| DE | 19927319 | 12/2000 | ............ G01S/11/06 |
| DE | 19957536 | 6/2001 | ............ B60R/25/00 |
| DE | 10038297 | 3/2002 | ............ B60R/25/00 |
| EP | 0848123 | 6/1998 | ............ E05B/49/00 |
| FR | 2749607 | 12/1997 | |
| GB | 21 79 751 | 3/1987 | ............ G01R/31/04 |
| JP | 07 057 792 | 3/1995 | ............ H01R/4/24 |
| JP | 09 312 190 | 12/1997 | ............ H01R/43/01 |
| WO | 99/59284 | 11/1999 | ............ H04L/1/00 |

*Primary Examiner*—Michael Horabik
*Assistant Examiner*—William Bangachon
(74) *Attorney, Agent, or Firm*—Baker Botts L.L.P.

(57) ABSTRACT

Anti-theft protection system for a motor vehicle, and a method for operating an anti-theft protection system. The anti-theft protection system has a transmitting and receiving unit in the motor vehicle, which transmits radar signals modulated over a broad bandwidth and then waits for echo signals. A code transmitter, which receives a radar signal, for its part sends back an additionally modulated and coded signal. An evaluation unit analyses all the received echo signals firstly for authorization of the code transmitter and secondly in order to determine the distance between the code transmitter and the transmitting and receiving unit.

11 Claims, 7 Drawing Sheets

U.S. PATENT DOCUMENTS

| | | | | |
|---|---|---|---|---|
| 5,649,295 A | | 7/1997 | Shober et al. ............. 455/38.2 |
| 5,670,933 A | | 9/1997 | Hayashi ...................... 340/426 |
| 5,736,793 A | | 4/1998 | Jahrsetz et al. ............ 307/10.1 |
| 5,815,108 A | | 9/1998 | Terk .......................... 341/176 |
| 5,838,255 A | | 11/1998 | Di Croce .............. 340/825.69 |
| 5,917,449 A | | 6/1999 | Sanderford et al. ......... 342/457 |
| 5,956,259 A | * | 9/1999 | Hartsell et al. ............. 700/302 |
| 6,046,683 A | | 4/2000 | Pidwerbetsky et al. 340/825.54 |
| 6,064,320 A | | 5/2000 | d'Hont et al. .............. 340/933 |
| 6,101,428 A | | 8/2000 | Snyder .......................... 701/2 |
| 6,107,910 A | | 8/2000 | Nysen ...................... 340/10.1 |
| 6,179,273 B1 | | 1/2001 | Edmunds, III et al. .... 256/13.1 |
| 6,236,333 B1 | * | 5/2001 | King ........................ 340/5.61 |
| 6,259,991 B1 | | 7/2001 | Nysen ........................ 701/300 |
| 6,323,566 B1 | | 11/2001 | Meier ........................ 307/10.2 |
| 6,353,776 B1 | * | 3/2002 | Rohrl et al. .................... 701/1 |
| 6,380,845 B2 | | 4/2002 | Tuttle ........................ 340/10.4 |
| 6,414,586 B1 | | 7/2002 | Yoshizawa .................. 340/5.2 |
| 6,414,626 B1 | * | 7/2002 | Greef et al. ................ 342/127 |
| 6,424,056 B1 | | 7/2002 | Irvin ........................ 307/10.1 |
| 6,429,768 B1 | | 8/2002 | Flick ......................... 340/5.2 |
| 6,438,466 B1 | * | 8/2002 | Voigtlaender et al. ......... 701/1 |
| 6,480,098 B2 | | 11/2002 | Flick ......................... 340/7.2 |
| 6,538,560 B1 | | 3/2003 | Stobbe et al. .............. 340/5.72 |
| 6,617,975 B1 | | 9/2003 | Burgess ................ 340/815.47 |
| 6,693,581 B2 | * | 2/2004 | Gottwald et al. ............. 342/70 |
| 6,697,616 B1 | | 2/2004 | Heinz et al. ................ 455/424 |
| 6,809,629 B2 | * | 10/2004 | Heide et al. ............... 340/5.61 |
| 2001/0005170 A1 | | 6/2001 | Heide et al. ............... 340/5.61 |

\* cited by examiner

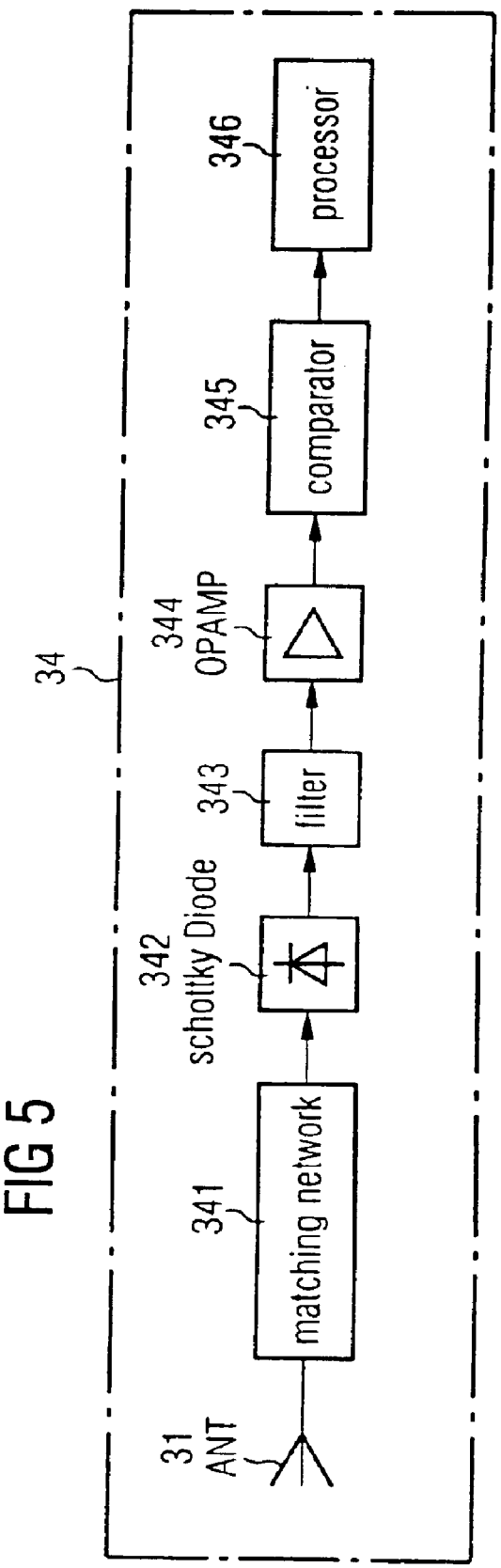

ANTI-THEFT PROTECTION SYSTEM FOR A MOTOR VEHICLE, AND A METHOD FOR OPERATING AN ANTI-THEFT PROTECTION SYSTEM

CROSS REFERENCE TO RELATED APPLICATIONS

This application claims the benefit of priority based on German Application No. 199 57 536.3, filed Nov. 30, 1999, which is incorporated by reference herein in its entirety.

BACKGROUND OF THE INVENTION

The invention relates to an anti-theft protection system for a motor vehicle, and to a method for operating an anti-theft protection system. The system and the method allow access to (e.g., via a closure system), and use of (e.g., via an immobilizer), a motor vehicle only when authorization is verified.

It is believed that electronic, generally radio-based, closure systems are increasingly replacing conventional mechanical closure systems. It is believed that examples of such radio-based closure systems comprise a code transmitter (e.g., an electronic key, ID transmitter, or ID tag) and at least one transmitting and receiving unit in the motor vehicle. It is believed that examples of such code transmitter have a transponder that contains an electronic code, which is interrogated via radio transmission by one or more of the transmitting and receiving units.

It is believed that various non-contact types of transmission are currently in general use in motor vehicle technology. It is believed that examples of low-frequency systems, e.g., in the 125 kHz frequency band, transmit and receive signals via coils. It is also believed that there are high-frequency systems, e.g. at 433 MHz or 868 MHz.

It is believed that, in general, microwave systems or radar systems can be used for transmitting signals. It is believed that when using radar signals, range or distance can be measured using the radar principle. It is further believed that when using microwaves, distance measurements are essentially based on a radar signal being transmitted in the direction of the measurement object, being reflected by the object, and being received as a reflected signal after a delay time. It is believed that the distance to the object, or changes in that distance, can be deduced by evaluating the phase or time difference between the transmitted signal and the received signal. In addition to pulse delay-time measurement, it is believed that frequency-modulation (FM) or correlation methods can also be used for distance measurement. The general radar measurement principles are described, for example, in J. Detlevsen "Radartechnik" [Radar technology], Springer-Verlag, Berlin, 1989.

When such radio frequency (RF) transmission methods are used for transmitting remote-control signals to closure systems or anti-theft protection systems for motor vehicles, it is believed to be very important to know the location of the code transmitter in order to prevent an unauthorized third party, who is not located in the vicinity of the motor vehicle, from gaining access to the motor vehicle.

It is believed that one possibility for distance measurement is evaluating the mean transmitted power of the radio signals. It is believed that this can be done quite well in low-frequency systems, but involves considerable complexity in terms of antenna design and antenna fitment and, frequently, special adaptations to different motor vehicle types.

SUMMARY OF THE INVENTION

An advantage of the present invention is that it can provide an anti-theft protection system that takes into account the distance between a code transmitter and the motor vehicle. For example, a transmitting and receiving unit in a motor vehicle can transmit transmitted signals over a broad bandwidth and wait for echo signals. All the received echo signals are supplied to an evaluation unit. The evaluation unit can use the echo signals to determine: (1) the authorization, and (2) a statement relating to the distance between the code transmitter and the motor vehicle. Appropriate elements, such as a central locking system or an immobilizer, can then be controlled based on the determinations of the evaluation unit.

The present invention provides an anti-theft protection system for a motor vehicle. The anti-theft protection system comprises a transmitting and receiving unit adapted to be arranged on the motor vehicle, a code transmitter adapted to be portable with respect to the motor vehicle, and an evaluation unit evaluating an echo signal to determine authorization of the code transmitter and to determine a distance between the code transmitter and the transmitting and receiving unit. The transmitting and receiving unit transmits a transmitted signal that is modulated over a broad bandwidth. And the code transmitter transmits the echo signal at least in response to receiving the transmitted signal.

The present invention also provide a method for operating an anti-theft protection system for a motor vehicle. The method comprises transmitting a transmitted signal from a transmitting and receiving unit adapted to be arranged on the motor vehicle, receiving an echo signal transmitted from a code transmitter adapted to be portable with respect to the motor vehicle, and evaluating the echo signals in an evaluation unit adapted to be arranged on the motor vehicle. The transmitting includes modulating the transmitted signal over a broad bandwidth. And the evaluating includes determining authorization of the code transmitter and determining a distance between the code transmitter and the transmitting and receiving unit.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

FIGS. 2 to 5 show schematic diagrams of embodiments of the anti-theft protection system shown in FIG. 1.

DETAILED DESCRIPTION OF THE PREFERRED EMBODIMENT

Figure 1:
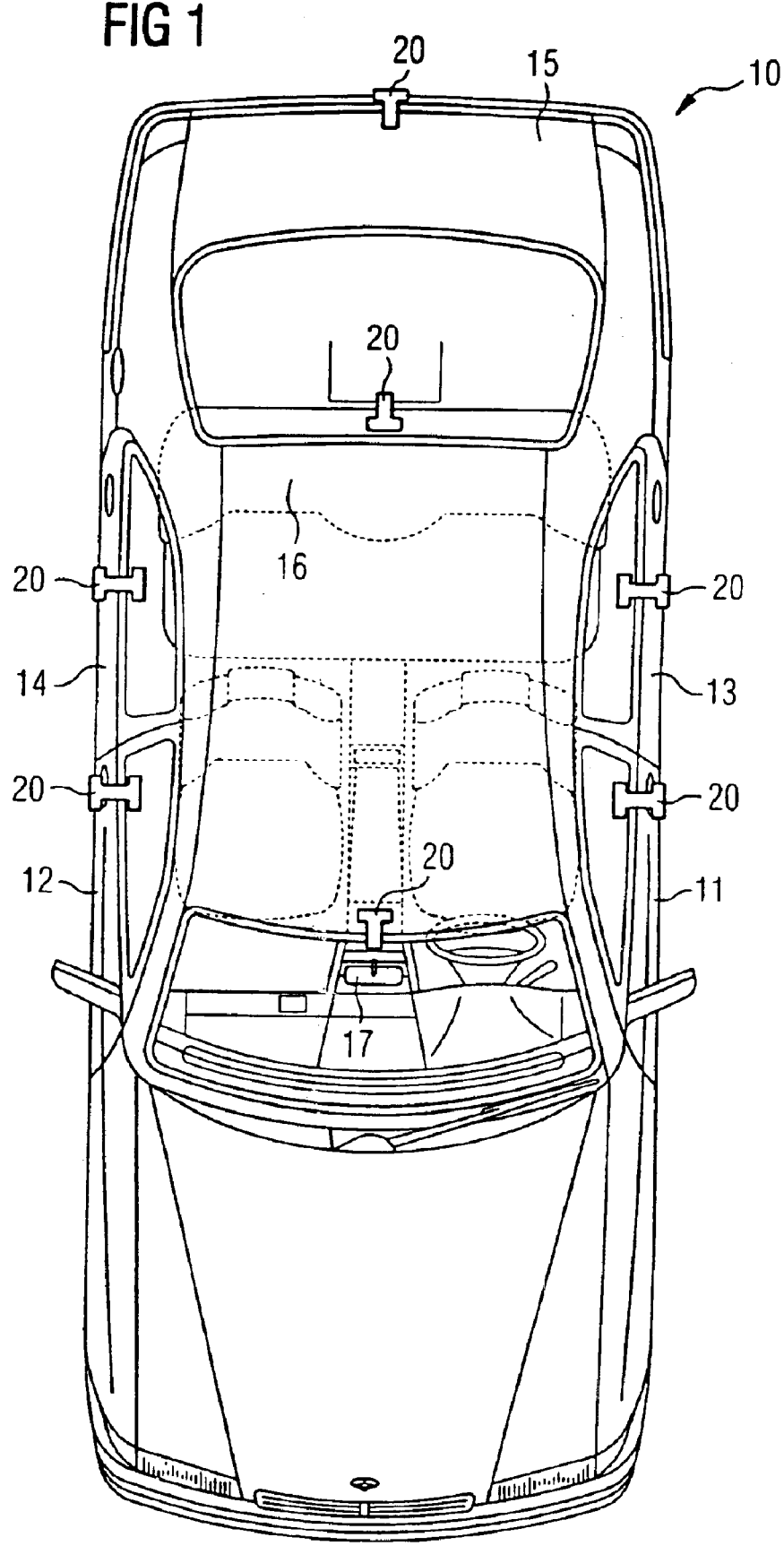
FIG. 1 shows an example of anti-theft protection system according to the invention. In this example, the anti-theft protection system is arranged with respect to a motor vehicle.
Figure 2:
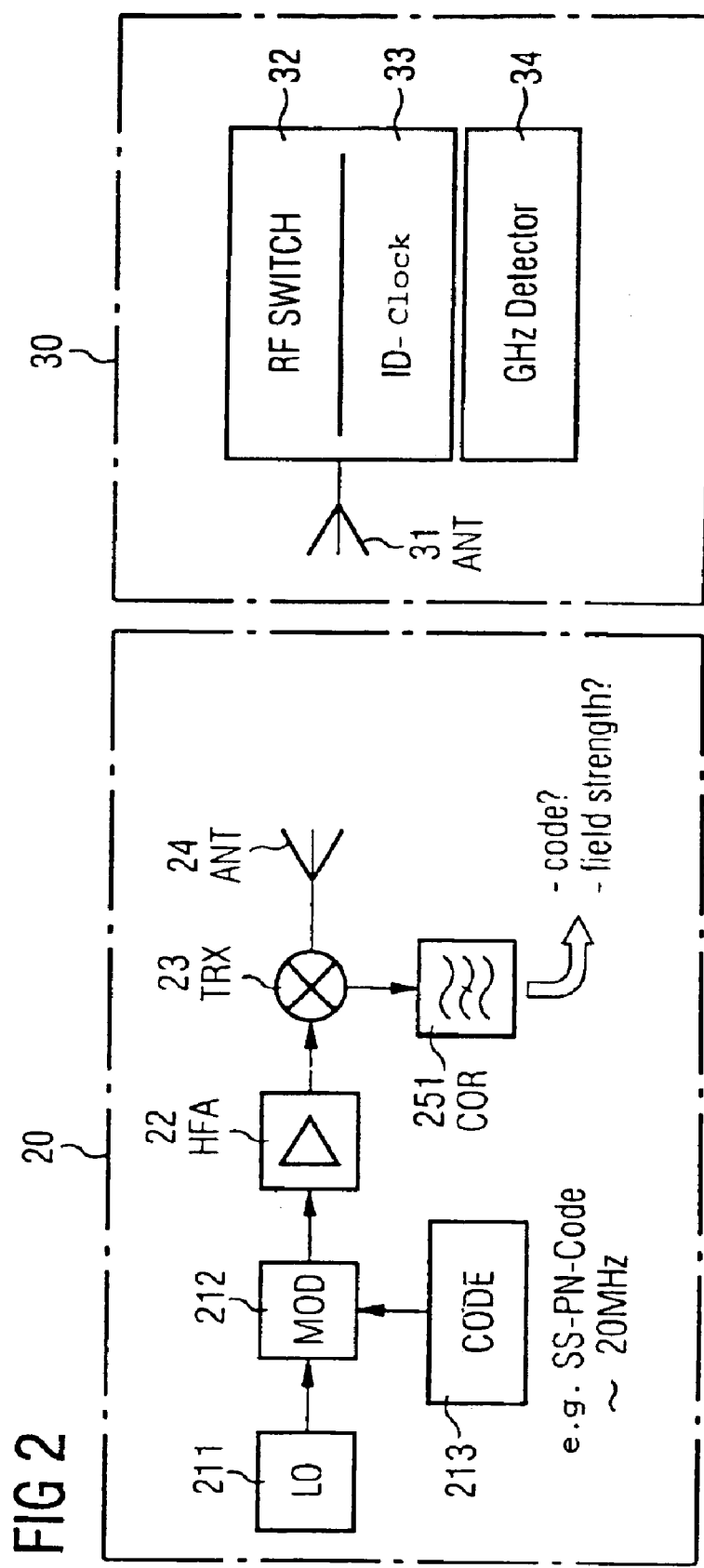

Referring initially to FIGS. 1 and 2, an anti-theft protection system for a motor vehicle 10 has a transmitting and receiving unit 20, which is arranged in the vehicle 10, for example on the internal mirror/rear-view mirror 17. This transmitting and receiving unit 20 transmits signals as periodically required or continually, and then waits to receive reflected signals (referred to as echo signals in the following text).

The transmitted signals are modulated over a broad bandwidth in the microwave band. These signals are partially or completely reflected by objects, or are reflected more than once on the way back to the receiving unit.

Broadband in this case means that an oscillator frequency is varied and demodulated or modulated within a relatively wide frequency band during transmission or reception. This contrasts with typical modulation, in which modulation and demodulation are carried out at a fixed carrier frequency.

If a portable code transmitter 30 with a transponder is located in the effective range of the transmitting and receiving unit 20 (that is to say within range) and receives a transmitted signal, then, for its part, it carries out a modulation process, normally with the modulation frequency $f_M$, and sends back a modulated code signal (by means of an active reflector, which is also referred to as backscatter in the specialist jargon).

In a first exemplary embodiment of an anti-theft protection system as shown in FIG. 2, authentication (transmission of an interrogation signal, sending back a code signal, and evaluating the code signal to determine its authorization) is carried out using a correlation receiver. The anti-theft protection system can comprise more than one code transmitter 30 and a number of transmitting and receiving units 20 (seven are illustrated) can be mounted in the motor vehicle 10. One or more of the transmitting and receiving units 20 transmit an interrogation signal. A code transmitter 30, which receives the interrogation signal, responds with its code signal.

The transmitting and receiving unit 20 in this case comprises a local oscillator 211 (LO), a modulator 212 (MOD), a code memory 213 (CODE), an RF amplifier 22 (HFA), a transceiver 23 (TRX) or mixer, an antenna 24 (ANT) and a correlator 251 (COR). The signal produced by the local oscillator 211 is modulated in the modulator 212 with a code from the code memory 213. The RF amplifier 22 is used for signal preprocessing and for decoupling the receiver section of the transceiver 23 from the signal generator. The interrogation signal, which is modulated over a broad bandwidth in the microwave band, is passed via the transceiver 23 and is transmitted via the antenna 24.

The code transmitter 30 operates as a modulating "backscatter" and thus has a modulating reflector, which also modulates the received transmitted signal and sends it back in coded form. For this purpose, the code transmitter 30 has an antenna 31 (ANT) that is connected to an RF switch 32 and a dedicated clock 33 (ID clock) that is characteristic of the code transmitter 30. A radio-frequency detector 34 (GHz detector) can identify an interrogation signal that matches the code transmitter 30. The RF switch 32 then becomes active using a predetermined clock cycle (corresponding to the coding) that is characteristic of the code transmitter 30, and switches the antenna 31 such that an interrogation signal is reflected once and is then not reflected again.

The oscillation of the local oscillator 211 can be modulated with square-wave pulses of variable length τ. The received echo signal is mixed with the modulated interrogation signal in the mixer 23. The correlator 251 transfers the mixing product into an autocorrelation function (see FIG. 7), which is then evaluated. Phase modulation or frequency modulation is likewise possible.

Figure 6A:
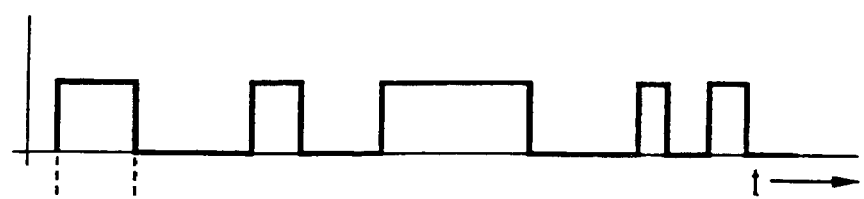
FIGS. 6A and 6B show binary representations of the interrogation signal and echo signal, respectively.
Figure 6B:
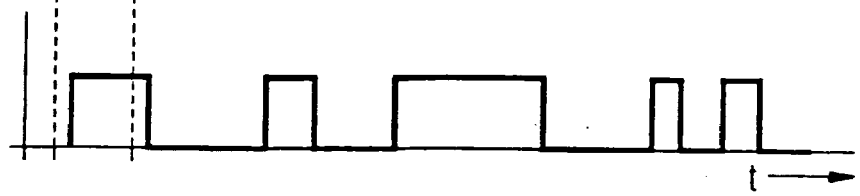
Figure 7:
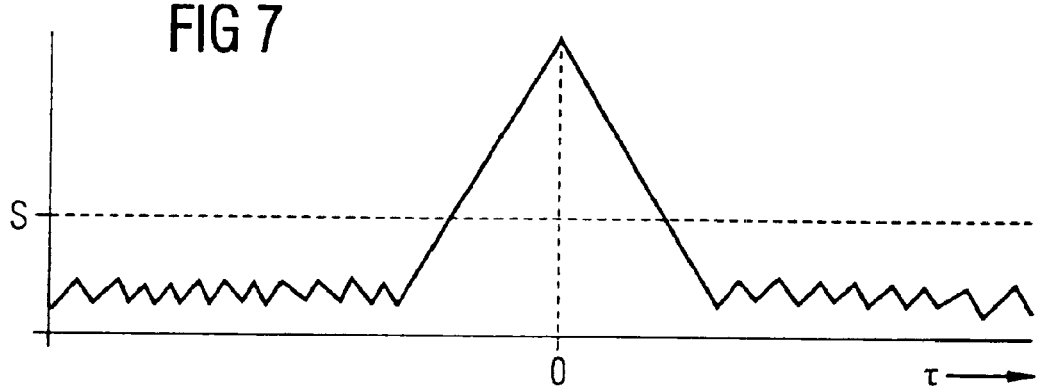
FIG. 7 shows an associated autocorrelation function that is obtained by correlating the interrogation signal and the echo signal.

FIG. 6A illustrates one example of a transmitted signal. FIG. 6B illustrates the echo signal that has been delayed with respect to the transmitted signal owing to signal delay times. The associated auto-correlation function is illustrated in FIG. 7. If the signal delay time τ is approximately 0, this means that there are no delay time differences, and that the amplitude of the autocorrelation function assumes a maximum. Thus, the code transmitter 30 is indicated to be located in the immediate vicinity of the transmitting and receiving unit 20. As the delay time differences Δτ increases, the amplitude of the autocorrelation function decreases, which indicates a greater distance between the code transmitter 30 and the motor vehicle 10. Accordingly, the amplitude of the autocorrelation function decreases continuously until, finally, it is below the noise level, and reasonable measurement is no longer possible.

By defining a threshold value S (shown by the dashed, horizontal line in FIG. 7), only those code signals that have an autocorrelation function with amplitude greater than the threshold value S are checked for authorization. This ensures that the code transmitter 30 is located within a predetermined distance around the motor vehicle 10. The threshold value S and thus the maximum distance to the code transmitter 30 are adjustable as desired. Signals from code transmitters 30 that are further away are automatically suppressed and are ignored. Thus, the motor vehicle 10 cannot be unlocked from a long distance. Unauthorized eavesdropping and reproduction of the code signal are made more difficult since broadband modulation is used.

The transmitted signal can be modulated with binary pulses (e.g., square-wave pulses). The pulse-repetition time must, however, be longer than the signal delay time for a maximum distance (operating range of the anti-theft protection system) since, otherwise, code transmitters 30 which are located too far away would be delayed into the next pulse period and could be confused with code transmitters 30 at are located in the vicinity of the motor vehicle 10.

So-called pseudo noise modulation (PN modulation) can be used for modulation at the transmitter end. Apart from PN modulation, other types of modulation can also be used with a Barker code, shift-register sequences (so-called M sequences), Golay or Gold codes, or Huffmann sequences. If there are a number of transmitting and receiving units 20, then a number of such codes, which do not correlate or correlate only to a minor extent, can also be used.

One suitable type of transmitter-end modulation can be spread spectrum modulation. By choosing a very high code clock rate (e.g., spread spectrum-pseudo noise modulation code (SS-PN code)), it is possible to consider only those received signals that are within a maximum distance defined by the clock rate. Signals from a greater distance, and thus with a greater delay time, are suppressed on the basis of the correlation characteristics of the PN modulation.

Thus, access and use monitoring (e.g., unlocking of the doors or disabling the immobilizer) takes into account only those code signals that originate from code transmitters 30 located in the vicinity of the motor vehicle. The user must therefore be located in the vicinity in order to be able to unlock the doors. Code transmitters 30 which are further away are automatically ignored. This is possible only because the interrogation signals that are transmitted are modulated over a broad bandwidth in the microwave band, and because appropriate evaluation can therefore be carried out using the received code signals.

Figure 3:
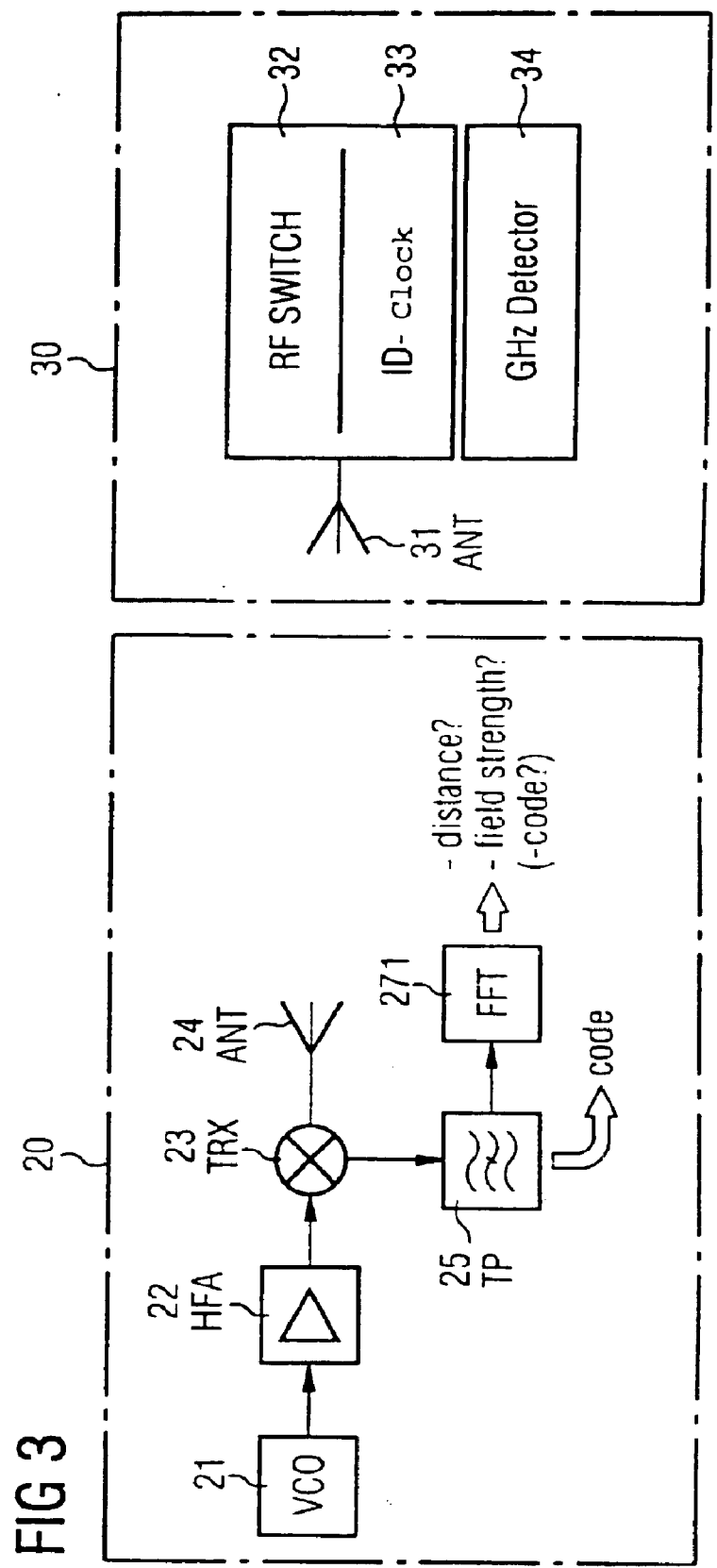

A second exemplary embodiment of an anti-theft protection system for a motor vehicle will be explained in more detail with reference to FIG. 3. In this case, the transmitting and receiving unit 20 is in the form of a frequency modulated-continuous wave (FM-CW) radar and comprises a tunable-frequency oscillator 21 (VCO), an RF amplifier 22 (HFA), a transceiver 23 (TRX) or mixer, an antenna 24 (ANT), a low-pass filter 25 (TP) and a fast Fourier processor 271 (FFT). When the FM-CW radar method is used, the transmitted signal is mixed with the received signals. A low-frequency measurement signal is thus obtained, which can be evaluated.

The code transmitter 30 is designed in generally the same way as that shown in FIG. 2. By using a directional coupler, such as a circulator, the code transmitter 30 may have only a single antenna 31. It is likewise possible to use code transmitters 30 having two or more antennas.

The processor 271 is used as an evaluation unit in which the received signals are evaluated, and the distance between the code transmitter 30 and the transmitting and receiving unit 20 are determined by using the delay times of the echo signals or by using the received field strength. The code of the code transmitter 30 can likewise be determined by using the echo profile, as will be explained in more detail further below.

The signal (code signal or echo signal) received by the transmitting and receiving unit 20 is mixed with the demodulated transmitted signal in the transceiver 23. The demodulated signal is filtered in the low-pass filter 25, so that signals at higher frequencies (which originate from objects further away) are automatically ignored in the evaluation process. The processor 271 is then used to determine the distance and the amplitude of the echo signal, which are then compared with a defined reference code, by which means the authorization of the code transmitter 30 is checked.

When using the FM-CW radar method, the transmitted signal is mixed with the reflected signals. A low-frequency measurement signal can be obtained whose frequency spectrum is illustrated as an echo signal with its echo profile in FIG. 8.

The modulation process in the code transmitter 30 results in the code signal being converted, for example, from baseband 41 to another frequency band (for example a sideband 42, 42'). These code signals are received both on the direct path from the code transmitter 30 to the transmitting and receiving unit 20 and, in part, by the transmitting and receiving unit 20 after being reflected a number of times by objects.

Figure 8:
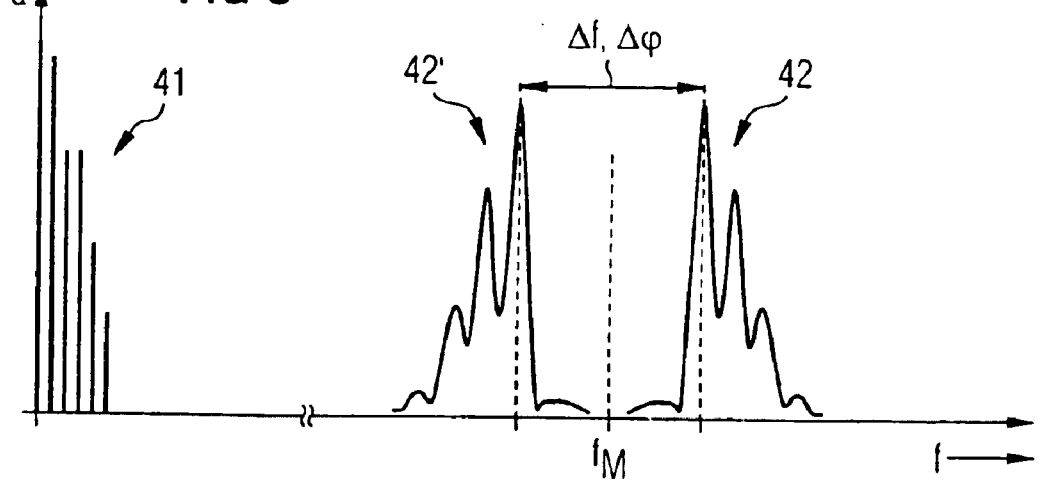
FIG. 8 shows a frequency spectrum of an echo signal measured by a receiving unit in the anti-theft protection system.
Figure 9A:
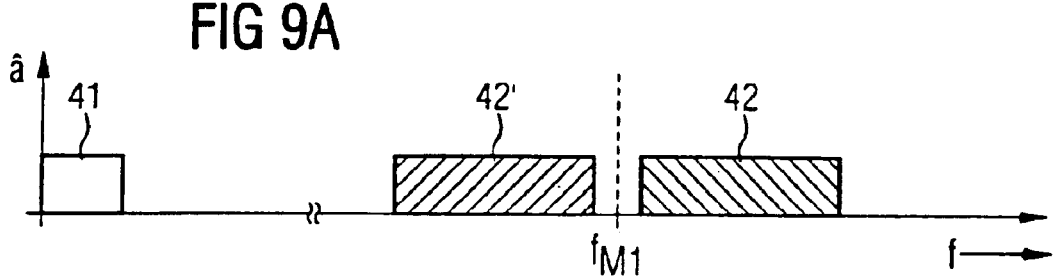
FIGS. 9A to 9D show frequency spectra of the echo profiles for decoding the received echo signal.
Figure 9B:
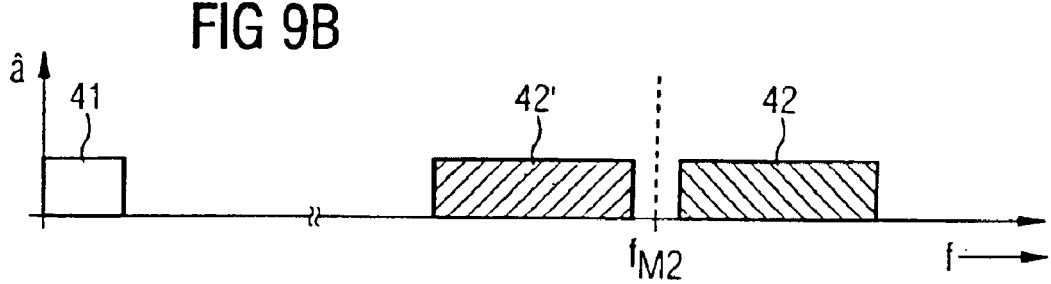
Figure 9C:
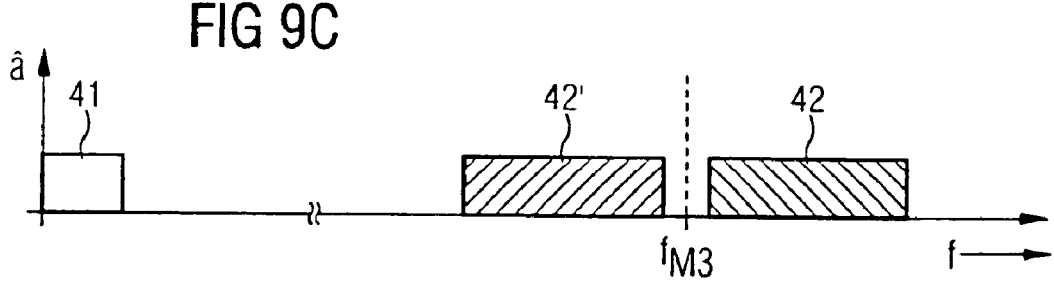
Figure 9D:
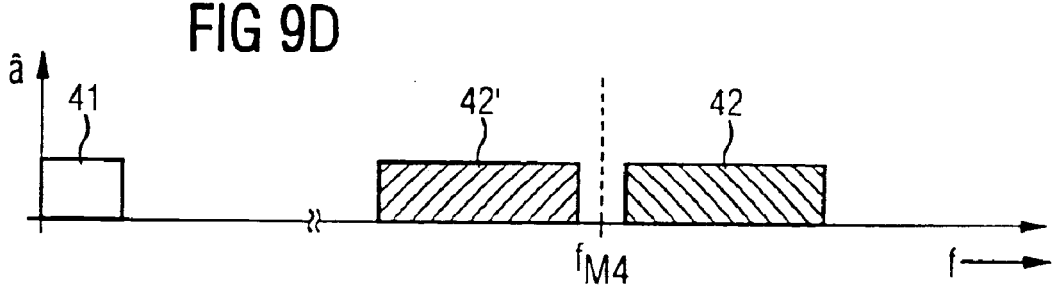

FIG. 8 illustrates the frequency spectrum of the echo signals that are received by the transmitting and receiving unit 20 as measurement signals (echo signals) and that are preprocessed by the FFT processor 271. The envelope curve of all the amplitudes â of the echo signals over the entire frequency band, or at least a section of it, is referred to here as the echo profile, which is evaluated. Amplitudes â, phases $\Phi$, and the frequency f of the echo signals are thus measured and are further-processed in a computation unit.

The transmitting and receiving unit 20 can operate on the principle of the FM-CW method, which is known from radar technology. In this case, the transmitted frequency is varied within a predetermined frequency band (bandwidth). The distance to an object can be determined by measuring the frequency difference $\Delta f$ or the phase difference $\Delta \Phi$ between the transmitted frequency and the received frequency. The received frequency f or phase $\Phi$ are thus proportional to distance.

As a consequence of the frequency conversion by the modulation of the code transmitter 30, there are echo signals in the upper frequency band (corresponding to the two sidebands 42 and 42' when using double sideband modulation), and these are used as an echo profile (distribution of the echo signals over the frequency f and/or time t) for evaluation of the echo signals and for distance measurement. The modulation process (preferably frequency modulation) results in two sidebands 42 and 42', which are symmetrical with respect to the modulation frequency $f_M$ of the code transmitter 30. Since the echo signals transmitted by the code transmitter 30 are likewise partially reflected a number of times by objects, a number of maximum values are obtained above the frequency f, and their associated frequencies each represent a distance to an object. The echo profile of one sideband 42 or 42' is sufficient to carry out an evaluation process in an evaluation unit, such as a microprocessor 27.

The greater the frequency of a reflection maximum in the echo profile, the greater is the distance to the object on which the transmitted signal has been reflected, or by which (in the case of the code transmitter 30) a code signal has been transmitted.

The first maximum (the closest to the modulation frequency $f_M$ in FIG. 8) of the upper sideband 42 is a direct echo signal from the code transmitter 30 (that is to say the direct free-space transmission without any reflection). The other maxima represent additional reflections on objects. Their delay time to the transmitting and receiving unit 20 is greater. They thus occur at higher frequencies.

The echo signals, which are reflected directly on objects such as the bodywork of the motor vehicle 10 or other objects located in the vicinity of the motor vehicle 10, occur in the frequency region around the mixing frequency 0 Hz (also referred to as baseband 41). Direct reflections (i.e., signals transmitted from the transmitting and receiving unit 20 that are directly reflected back to the transmitting and receiving unit 20; see baseband 41 in FIG. 8) can be suppressed for the evaluation, and can thus be ignored from then on, by means of suitable modulation of the code transmitter 30 as described, for example, in German patent application 199 46 161.9, which is incorporated in its entirety herein by reference. Since these echo signals occur in baseband 41, they are of less interest.

In the evaluation unit, the echo profile is initially evaluated to determine the authorization of the code transmitter 30 (that is to say does the code signal match the expected code signal) and subsequently evaluated to determine the distance between the code transmitter 30 and the motor vehicle 10. If the code transmitter 30 is authorized and it is located within a predetermined range around the motor vehicle, then appropriate actions are controlled, such as unlocking or locking door locks, disabling or enabling the immobilizer, closing windows, unlocking or locking the trunk, unlocking or locking the tank filler cap, etc.

For basic distance measurement, it is sufficient to evaluate one of the two sidebands 42 or 42' from FIG. 8. In order to keep the illustration simple, any influences from additional modulation (in addition to the transmitter-end modulation on which the distance measurement is based) that would cause the echo profile to have a different appearance are regarded as having been compensated for. In principle, such compensation allows any radar or microwave distance measurement to be changed to such a profile, even if it relates to a modulated, active reflector.

Figure 4A:
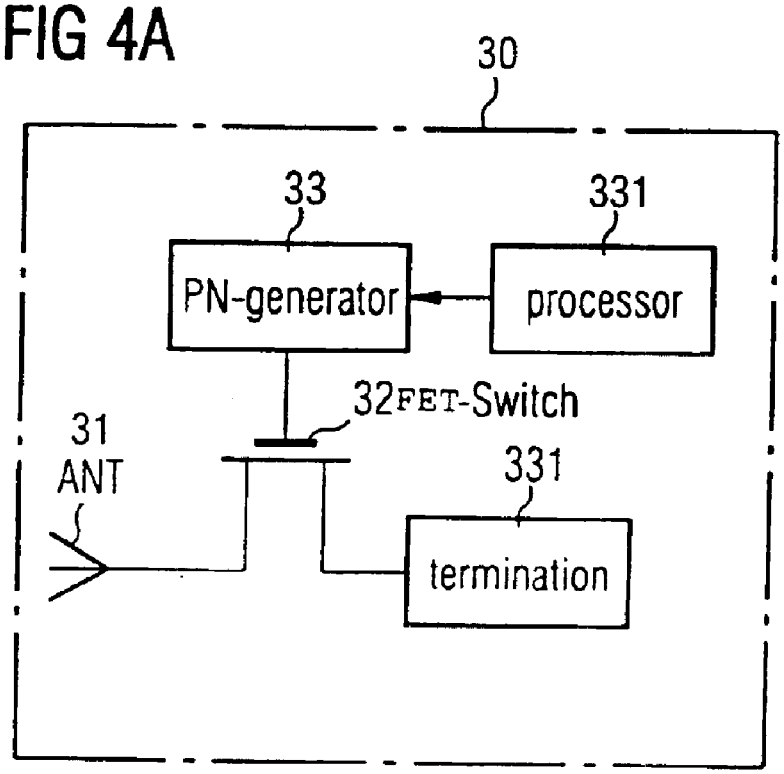
Figure 4B:
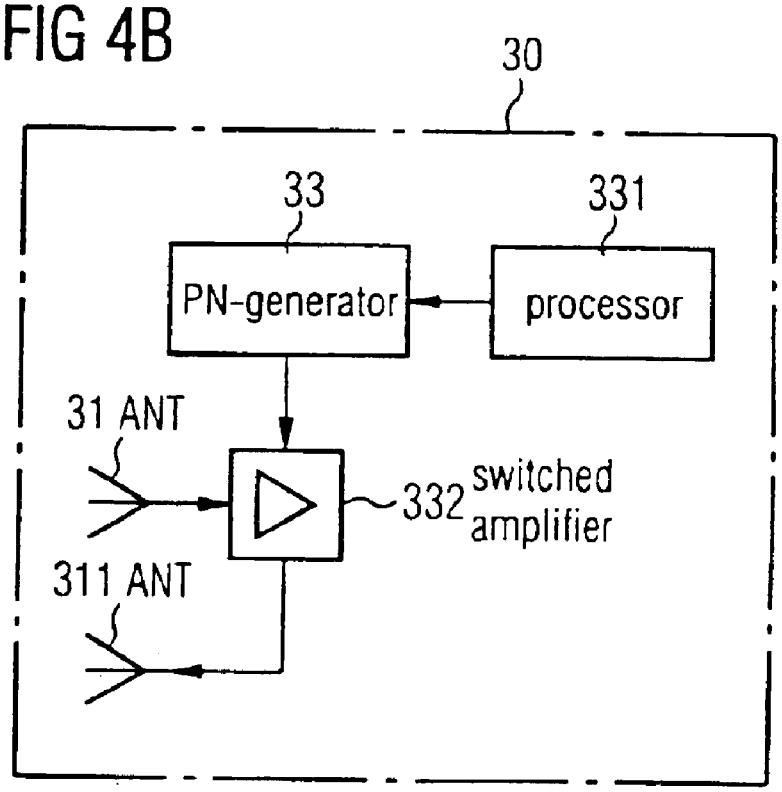

The code transmitter 30 may be in the form of a passive reflector (as shown in FIG. 4A) or else in the form of an active reflector (as shown in FIG. 4B). The code transmitter 30 as a passive reflector contains an RF switch 32, a clock generator 33 (PN generator) and a control processor 331 (processor). In the simplest case, the RF switch 32 produces amplitude modulation. This may be achieved by varying the impedance of a load 331 (termination) or by switching backward and forward between two loads (passive backscatter).

In the code transmitter 30 that is operating as an active reflector (FIG. 4B), the modulated signal is additionally (actively) amplified by an amplifier 332 upstream of a transmitting antenna 311 (active backscatter). The modulated signal is thus also amplitude-modulated.

A further option for coding in the code transmitter 30 is to use phase modulation or frequency modulation. Corresponding methods are known, for example, from R. Mäusl, "Digitale Modulationsverfahren—Telekommunikation" [Digital modulation methods—telecommunication], Heidelberg: Hüthig-Buch-Verlag GmbH, 1991. A further coding option is to delay the signals in each code transmitter by a defined time period. The time delay should be chosen to be sufficiently large that other interference signal elements, caused by reflections on objects in the measurement area, for example, will very largely have decayed as a result of the propagation attenuation in free space. All the coding options mentioned may also be combined.

Different types of coding in the code transmitter 30 can be used according to the invention. However, it is important for an interrogation signal actually to be coded in the code transmitter 30.

If a number of transmitting and receiving units 20 and/or a number of code transmitters 30 are used, then it is worthwhile for high-precision measurement to determine the distance values for all the measurement paths at the same time. However, this is feasible only if the various units do not interfere with one another. This can be ensured, for example, for the transmitting and receiving unit 20 by two transmitting and receiving units 20 not transmitting and receiving in one micro-wave frequency band at the same time. At the code transmitter end, mutual interference can be prevented by suitable modulation. Thus, for example, each code transmitter 30 can offset the received interrogation signal by a frequency that is characteristic of it.

In order to "wake up" the code transmitter 30 when it is approaching the motor vehicle 10, it may have a so-called GHz detector 34 (FIG. 5) as an input stage. The GHz detector 34 is connected to the antenna 31, which receives a signal from the transmitting and receiving unit 20. This signal is passed with as low a reflection level as possible via an impedance matching network 341 to a Schottky diode detector 342. The detector 342 rectifies the signal. It is then low-pass filtered in a filter 343, and is amplified by an operational amplifier 344. If a threshold value defined by a comparator 345 is exceeded, the code transmitter 30 is activated via a processor 346, that is to say the components in the code transmitter 30 are supplied with power.

The GHz detector 34 can also be used as a power source for the emergency mode of the code transmitter 30 if its own power supply (e.g., a battery) fails. This is because the DC voltage produced in the detector 342 then replaces the supply voltage for the code transmitter 30.

The way in which the distance between a code transmitter 30 and a transmitting and receiving unit 20 is determined will be explained in more detail with reference to the exemplary embodiment shown in FIG. 3.

The transmitting and receiving unit 20 has measurement means that are suitable for determining the phase difference between the transmitted interrogation signal and the received code signal. For example, the mixer 23 and the low-pass filter 25 are used to extract phase values of the signals. A change in distance can then be determined in the processor 271, from at least one phase value. An accurate distance measurement can be obtained by using at least two phase values that have been determined at at least two different microwave frequencies $f_{RF}$ (or at successive times).

The phase difference $\Phi$ between the interrogation signal and the code signal is:

$$\Phi = 2*\pi*f_{RF}*\tau$$

where $\tau$ is the total delay time of the signal. Apart from constant offset influences $\tau_{offs}$, the delay time $\tau$ is directly linked by the propagation speed c of the microwave to the distance d between the code transmitter 30 and the transmitting and receiving unit 20, as follows:

$$\tau = \tau_{offs} + \frac{2 \cdot d}{c}$$

Since the phase is periodic (and since the offset $\tau_{offs}$ is generally unknown), a phase measurement at only one constant microwave frequency $f_{RF}$ is suitable only for determining differential changes in distance. An absolute position value can in this case be determined only by successive, continual determinations of the change in distance, following a calibration measurement relative to the calibration reference point.

In a continual measurement process, care must be taken to ensure that the measurement is carried out sufficiently quickly that the change in distance between two measurements is not sufficiently great as to result in a phase change of more than 180°. This condition corresponds to the generally known sampling theorem. Continual phase measurement is also frequently referred to as Doppler measurement, in which the time derivative of the phase corresponds to the Doppler frequency. The Doppler frequency is proportional to the relative velocity between the code transmitter 30 and the transmitting and receiving unit 20 in the direction of signal transmission.

For absolute distance measurement, at least two phase values, which are determined at at least two different microwave frequencies $f_{RF1}$ and $f_{RF2}$, must be evaluated. If $\Delta f_{RF}$ is the frequency difference between two microwave frequencies $f_{RF1}$ and $f_{RF2}$, the phase difference $\Phi\Delta$ between the measured phase values $\Phi_1$ and $\Phi_2$ is given by:

$$\Delta\Phi = 2*\pi*f_{RF}*\tau$$

If the frequency difference $\Delta f_{RF}$ is not chosen to be excessively large, then the phase difference $\Delta\Phi$ is unique within a relatively large distance range. To obtain measured values that are as good as possible, the frequency difference $\Delta f_{RF}$ must also not be chosen to be unnecessarily small. Accurate distance measurements within a large range can be achieved, without ambiguity, by using further measurement frequencies (and thus further phase measured values). In the specific case of continuous frequency modulation, the microwave frequency $f_{RF}$ is varied, and the phase change is measured over time. The known methods for FM-CW signal processing may be used for linear frequency modulation.

The distance can, of course, also be determined from the frequency f. Since the frequency represents a change in phase with time, all frequency-evaluating measurement methods are based on the phase relationships described above.

For high-precision measurement of distance, it is advantageous to combine the change in phase over time at a microwave frequency $f_{RF}$ (i.e., differential distance measurement using successive signals) with the phase difference values $\Delta\Phi$ at a number of microwave frequencies $f_{RF}$. The absolute measured values are thus corrected by means of the considerably more accurate differential change values.

For high measurement accuracy, it is also necessary for the microwave frequency $f_{RF}$ and, in particular, the frequency change $\Delta f$ to be set and maintained very accurately. Analogue control loops and calibration devices with reference delay elements and, in particular, phase locked loops (PLL) and direct digital signal synthesis may be used for this purpose.

The result of a single distance measurement for the code transmitter 30 can be supplied to a central computer in the motor vehicle 10, which gathers and further-processes the data from all the transmitting and receiving units 20.

In order to satisfy security and convenience requirements, it is important to anti-theft protection systems for the location or the position of the code transmitter 30 to be known. In particular, the information relating to whether the code transmitter 30 is located inside or outside the motor vehicle 10 can be of critical importance. The present invention can prevent the driver from being inadvertently locked out of the motor vehicle 10 if the code transmitter 30 is left in the motor vehicle 10. Furthermore, a second code transmitter 30 that is located inside the motor vehicle 10 can be deactivated if the motor vehicle 10 has been locked correctly using a first code transmitter 30 that is located outside the motor vehicle 10.

According to the present invention, those without a valid code transmitter 30, e.g., children or unauthorized third parties, can be prevented from starting the motor vehicle 10 if the authorized party with a valid code transmitter 30 is still located in the vicinity of, but not within, the motor vehicle 10. Thus, according to the present invention, starting the motor vehicle 10 can be prevented unless there is a valid code transmitter 30 inside the motor vehicle 10.

The question as to whether a third party with a valid code transmitter 30 can be granted permission to start the motor vehicle in the same situation can be made possible, depending on a security or convenience policy.

According to the present invention, it is also possible to prevent code transmitters 30 that are located too far away to unlock the motor vehicle, since a similar signal could possibly originate from an unauthorized third party that has recorded and reproduced the code signal without authorization.

According to the present invention, it is possible to use microwave systems, which are modulated over a broad bandwidth, to provide information about the distance to the code transmitter 30 and to provide an authorization check. Determining the position of the code transmitter 30, and thus to identify whether the code transmitter 30 is located inside or outside the motor vehicle, can be evaluated on the basis of the delay time/phases of the echo signals.

In particular, the present invention can use the determination of the distance between the code transmitter 30 and the transmitting and receiving unit 20 to decide whether the code transmitter 30 is located inside or outside the motor vehicle. Appropriate switching processes are then initiated in a corresponding manner, but only if the authorization exists (i.e., the code signal is authorized).

According to the present invention, a determination of whether the code transmitter 30 is located inside or outside the motor vehicle can be obtained by combining the distance measurement with a determination of position based on a triangulation measurement and/or evaluating the code signal level (e.g., mean transmitted power). In microwave systems, using only the mean transmitted power to detect whether the code transmitter 30 is located inside or outside the motor vehicle is significantly less effective since microwaves are reflected very strongly on objects inside and outside the motor vehicle 10, and the simple and known rules for propagation attenuation of electromagnetic waves in free space can no longer sensibly be used as the basis for power comparisons and power assessments.

To distinguish reliably whether the code transmitter 30 is located inside or outside the motor vehicle, it is advantageous to store the measurement and evaluation results from previous measurements as a reference pattern in a memory, and to take them into account in the present measurements. Relevant variables in this case are, for example, position and amplitude changes, and changes relating to the highlights in the echo profile. In some cases, simple averaging of measurement data or evaluation results can also lead to a considerable improvement in the measurement certainty.

The transmitting and receiving unit 20 is preferably based on the use of microwave systems that operate at frequencies of 2.4 GHz, 5.8 GHz, 9.5 GHz, 24 GHz, 61 GHz or 77 GHz. An advantage of such microwave systems is that, at the transmitter end, they can be modulated with such a broad bandwidth that they are highly suitable for carrying out a distance measurement based on the radar principle.

The transmitting and receiving unit 20 can also operate using other electromagnetic waves, such as optical waves. Ultrasound signals may likewise be used as transmitted signals.

FIG. 1 shows at least some possible locations for transmitting and receiving unit 20 in the motor vehicle 10. The transmitting and receiving units 20 are preferably located in at least one of the driver's door 11 or in the front seat passenger's door 12. The transmitting and receiving units 20 can each have two sensors, namely an exterior sensor and an interior sensor. If there are rear doors 13, 14, respective transmitting and receiving units 20 may likewise be arranged in each of them. Transmitting and receiving units 20 may also be arranged on the internal mirror 17, on the rear parcel shelf 16, and at the rear of the vehicle 10, in the vicinity of the trunk 15.

Each transmitting and receiving unit 20 transmits its transmitted signal in a preferred direction on request (for example by operating a switch or door handle on the motor vehicle 10), or when someone approaches the motor vehicle. These transmitted signals can be transmitted continually or intermittently. When the code transmitter 30 receives the transmitted signal, it sends back a code signal. The code signal and reflections of both the transmitted signal and of the code signal on objects result in the typical frequency profile (frequency spectrum) of the echo signal, which is received by the transmitting and receiving unit 20 and is evaluated in the evaluation unit.

The location and the number of transmitting and receiving units 20 depend on the vehicle geometry and the desired requirements with regard to the detection area in which the code transmitter 30 should be located, and with regard to the convenience in carrying the code transmitter 30. An advantage of assessing the echo profile is that the echo profile allows the requirements for distance measurement (measurement accuracy and the number of measurement points required) to be reduced considerably.

The radio-frequency modules in the transmitting and receiving unit 20 are designed, according to the second exemplary embodiment, such that they can supply echo profiles of the type described above. In this exemplary embodiment, the transmitting and receiving units 20 are designed on the basis of the known FM-CW radar principle. In this FM-CW method, a radar signal is transmitted which is frequency-modulated linearly or in steps (the transmission frequency is varied, while the reception frequency remains fixed). The transmitted signal is mixed with the received signal. It is believed that FM-CW is widely used and is thus sufficiently well known, e.g., in commercial radar transmitters, that it does not need to be described in any more detail here.

The distance measurement is based on one or more distance measured values that are supplied by the transmitting and receiving units 20 in whose detection area the code transmitter 30 is located. The position value(s) and results of previous measurements can be supplied to the central evaluation unit, which decides whether the code transmitter 30 is located inside or outside the motor vehicle 10, or how far the code transmitter 30 is away from the transmitting and receiving unit 20. Of course, the evaluation processes can be distributed between one or more processors.

The central evaluation unit can also decide whether only the driver's door 11, the front seat passenger's door 12, all the doors 11–14, or only the trunk should be unlocked or locked. This depends on which of the transmitting and receiving units 20, as can be distributed around the motor vehicle 10, is closest to the code transmitter 30. That is to say, one or more of the transmitting and receiving units 20 can be used to determine the direction from which the code signal arrived, or the direction from which the user is approaching the vehicle.

A distance value is calculated for each measurement of the phases of the signals, for each combination of transmitting and receiving units 20 and code transmitters 30, and for each microwave frequency $f_{RF}$. Distance changes are determined by continuous evaluation of a number of successive measurements. The precise position of the code transmitter 30 relative to the transmitting and receiving unit 20, and thus relative to the motor vehicle 10, and the spatial movement of the code transmitter 30 can be calculated by means of a triangulation calculation from the distance values and the associated distance changes.

For a triangulation calculation, it is preferable to have a plurality of the transmitting and receiving units 20 physically located at different positions. If there is a total of n transmitting and receiving units 20 and a total of m code transmitters 30, there are m+n−1 different distance paths or measurement paths. Thus, a system of m+n−1 geometric triangulation equations must then be solved for position determination.

It may also be advantageous to provide additional distance paths in order, in this way, to obtain redundant measurement information (corresponding to an over-defined equation system). In this way, it is possible to identify interference and to achieve higher measurement accuracy, for example by averaging.

According to the present invention, evaluation of the received echo signals allows switching processes to be carried out as a function of the distance to the code transmitter 30 just by means of a single transmitting and receiving unit 20. Although most positions of the code transmitter 30 can be identified, there may be some circumstances in which the measurements may not be completely accurate.

The entire interior of the vehicle and, at the same time, also large parts of the exterior can be "covered" by the radio-frequency transmitted signals by means of a single transmitting and receiving unit 20 that can be located on the internal mirror 17. Inside the motor vehicle, the transmitted signal is reflected backwards and forwards a number of times by the bodywork, and thus largely covers the passenger compartment. The windows do not act as reflectors, that is to say the transmitted signal generated inside the vehicle by the transmitting and receiving unit 20 can pass to the exterior. According to the present invention, it is possible to evaluate the echo signals using a single transmitting and receiving unit 20 to measure the distance between the code transmitter 30 and the transmitting and receiving unit 20.

The echo signal is also used to check the authorization for the code transmitter 30. Once the transmitting and receiving unit 20 has transmitted a microwave transmitted signal (using the FM-CW method), a code transmitter 30 that is located in the effective range of the transmitting and receiving unit 20 can receive this transmitted signal. The code transmitter 30 has a modulating reflector (for example an ultrasound wave filter or a surface acoustic wave filter) that modulates and sends back the transmitted signal, either directly or by being reflected from an object, as described above.

The modulation process is carried out using a code that is characteristic of the code transmitter 30 and is used as verification of access authorization to the motor vehicle 10. The code signal sent back is received and preprocessed by the transmitting and receiving unit 20, and is evaluated in the evaluation unit.

The modulation, demodulation and decoding processes will be explained with reference to FIGS. 8 and 9A to 9D. The transmitting and receiving unit 20 transmits a radio frequency transmitted signal. If the code transmitter 30 is addressed by the transmitted signal, then the amplitude â of the transmitted signal can be modulated at the modulation frequency $f_M$ (provided that frequency modulation is being used).

The interrogation signal received by the code transmitter 30 can be frequency modulated in the code transmitter 30, for example by a simple frequency shift, such that the echo signal that is sent back from the active reflector to the transmitting and receiving unit 20 is frequency-modulated. Consequently, the useful signal is transferred at least into one sideband 42, 42'. The transmitting and receiving unit 20 can separate the echo signal which is emitted from the active reflector from the interference signals in the baseband 41, for example by bandpass filtering the signal received by the transmitting and receiving unit 20.

The filtering or demodulation process can be carried out, for example, using an electronic circuit or algorithmically in a processor. An advantage is that interference influences are reduced and a long range can be achieved. Furthermore, it is flexible and comparatively economical.

FIG. 8 shows the entire frequency spectrum of all the echo signals received by the transmitting and receiving unit 20. In order to check the authorization, the reflections on other objects are ignored (this corresponds to the frequency lines in baseband 41 (on the extreme left in FIG. 8). In this case, the only frequencies that are considered are those located around the modulation frequency $f_M$ (that is to say in the two sidebands 42 and 42' that are a consequence of double sideband modulation).

The frequency interval Δf and the phase interval ΔΦ between the two sidebands 42 and 42' are proportional to the distance to the code transmitter 30. The mean value for symmetrical sidebands 42 and 42' gives the modulation frequency $f_M$, which can be calculated at the demodulator end by averaging. Data can be transmitted in modulated form by varying the modulation frequency $f_M$ in accordance with a predetermined algorithm in the code transmitter 30. FIGS. 9A to 9D illustrate frequency spectra with four different modulation frequencies $f_{M1}$ to $f_{M4}$. These correspond to four different "bits" of the code signal. If the change in the modulation frequencies $f_M$ matches a change that is expected by the evaluation unit, then the code transmitter 30 is authorized.

In this way, an eight-bit "word" can be transmitted per measurement process at modulation frequencies, for example in the band from 30 kHz to 55.6 kHz, subdivided into 100 Hz steps. This corresponds to a 256-value code word (256 different code options). The modulation bandwidth in this case depends on the number of coding options and on the security requirements. The maximum modulation bandwidth is governed by the pulse repetition time, which must be greater than the delay time for the maximum defined and still measurable distance between the code transmitter 30 and the transmitting and receiving unit 20. A typical bandwidth is 100 MHz, which offers a wide range of coding options and thus high security for the anti-theft protection system.

It is advantageous for each code transmitter 30 (with its active reflector) to transmit using a modulation frequency $f_M$ that is characteristic of that particular code transmitter 30. This makes it possible to distinguish between and separate signals from a number of code transmitters 30. Thus, apart from the position determination described above, each code transmitter 30 can also be independently checked for its authorization. Furthermore, each code transmitter 30 may be assigned a priority number for determining the code transmitter 30 to which priority is to be given, and whose authorization is critical. Personal data relating to the motor vehicle can also be transmitted with the code signal and, when the authorization is verified, appropriate settings may be implemented in the motor vehicle, such as seat and mirror adjustment.

If the code transmitter 30 is located outside the motor vehicle 10, then a received and authorized echo signal results in all the doors and closures of the motor vehicle 10 being locked or unlocked. If the code transmitter 30 is located inside the motor vehicle 10, and the echo signal is authorized, a vehicle immobilizer can be disabled. According to the present invention, it is also possible to disable the immobilizer only in combination with an additional action, e.g., if the driver is operating a start switch or operating other switching elements, such as the brake pedal or shift lever.

The code transmitter 30 may be in the form of a smart card or a conventional mechanical key. The code transmitter 30 can take any form so long as the echo signals with their echo profile are used to trigger an enable signal as a function of (1) the distance of the code transmitter 30 from the vehicle, and (2) authorization of a code signal.

The anti-theft protection system according to the invention allows the interrogation signal to be modulated over a broad bandwidth in the transmitting and receiving unit 20 in order to provide a defined distance limit (first exemplary embodiment). That is to say signals that originate from objects a long distance away are automatically ignored.

Accurate distance measurement can also be carried out (second exemplary embodiment) in addition to the authorization check. The accuracy of the distance measurement may be improved further by other measures, such as triangulation measurement.

The interrogation signal is thus modulated over a broad bandwidth during transmission, and this modulated signal is additionally modulated, in the code transmitter 30, with the code of the code transmitter. The modulation process at the transmission end then allows the received signal to be evaluated in order to determine the distance to the code transmitter 30.

In the various exemplary embodiments, elements having the same design or function have the same reference symbols in the figures.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. An anti-theft protection system for a motor vehicle, the anti-theft protection system comprising:

a transmitting and receiving unit adapted to be arranged on the motor vehicle, the transmitting and receiving unit transmitting a transmitted signal that is modulated over a broad bandwidth;

a code transmitter adapted to be portable with respect to the motor vehicle, the code transmitter transmitting an echo signal at least in response to receiving the transmitted signal, wherein the echo signal includes an authorization code; and an evaluation unit operable to determine a distance between the code transmitter and the receiving unit based on the echo signal and to evaluate the echo signal to verify the authorization code supplied from the code transmitter if the distance is determined to be above a threshold value.

2. The anti-theft protection system as claimed in claim 1, wherein the code transmitter modulates the transmitted signal and transmits the echo signal.

3. The anti-theft protection system as claimed in claim 1, wherein the transmitting and receiving unit is adapted to be arranged on at least one of an internal mirror and one or more doors of the motor vehicle.

4. The anti-theft protection system as claimed in claim 1, further comprising:

a plurality of the transmitting and receiving units adapted to be distributed on the motor vehicle, each of the plurality of the transmitting and receiving units transmit the transmitted signal and receive the echo signal; and wherein the evaluation unit evaluates the echo signal received by each of the plurality of the transmitting and receiving units to determine the distance between the code transmitter and the transmitting and receiving unit.

5. The anti-theft protection system as claimed in claim 4, wherein the evaluation unit triangulates the echo signal received by each of the plurality of the transmitting and receiving units to determine the location of the code transmitter with respect to the transmitting and receiving unit.

6. The anti-theft protection system as claimed in claim 1, further comprising:

a plurality of the code transmitters, each of the plurality of code transmitters transmitting different modulated echo signals; and wherein the evaluation unit evaluates and prioritizes the different modulated echo signals.

7. A method for operating an anti-theft protection system for a motor vehicle, the method comprising:

transmitting a transmitted signal from a transmitting and receiving unit adapted to be arranged on the motor vehicle, the transmitting including modulating the transmitted signal over a broad bandwidth;

in response to the transmitted signal, receiving an echo signal including an authorization code signal transmitted from a code transmitter adapted to be portable with respect to the motor vehicle; and evaluating the echo signal in an evaluation unit adapted to be arranged on the motor vehicle if the evaluating unit determines a distance between the code transmitter and the receiving unit to be above a threshold value based on the echo signal, the evaluating including verifying the authorization code signal from the code transmitter.

8. The method as claimed in claim 7, wherein the code transmitter modulates the transmitted signal and sends the echo signal back to the transmitting and receiving unit, and wherein the evaluating includes checking an echo profile of the echo signal.

9. The method as claimed in claim 7, wherein a plurality of the transmitting and receiving units are adapted to be distributed on the motor vehicle, and wherein the transmitting comprises a respective plurality of the transmitted signals and the evaluating comprises a plurality of the echo signals.

10. The method as claimed in claim 7, wherein the transmitting comprises a plurality of successive transmitted signals, and the evaluating comprises checking respective echo profile and determining at least one of the distance and a change in the distance.

11. The method as claimed in claim 7, wherein the transmitting comprises at least one of a microwave signal and a radar signal, the at least one signal being modulated over a broad bandwidth at frequencies greater than 1 GHz.

* * * * *